Nov. 15, 1949     M. J. HERZBERGER ET AL     2,487,873
APOCHROMATIC TELESCOPE OBJECTIVE HAVING
THREE AIR SPACED COMPONENTS

Filed Oct. 2, 1946     2 Sheets-Sheet 1

| EF = 100 mm. | | | | f/5 |
|---|---|---|---|---|
| LENS | N | V | RADII | THICKNESSES |
| I | 1.434 | 95.4 | $R_1$ = +49.1 mm. | $t_1$ = 3.4 mm |
|  |  |  | $R_2$ = −42.6 | $s_1$ = 5.1 |
| II | 1.620 | 60.4 | $R_3$ = −34.1 | $t_2$ = 1.2 |
|  |  |  | $R_4$ = +108.0 | $s_2$ = 7.1 |
| III | 1.434 | 95.4 | $R_5$ = +62.9 | $t_3$ = 2.6 |
|  |  |  | $R_6$ = −62.9 | BF = 89.2 |

MAXIMILIAN J. HERZBERGER
HARVEY O. HOADLEY
*INVENTORS*

BY
*ATTY & AG'T*

Nov. 15, 1949   M. J. HERZBERGER ET AL   2,487,873
APOCHROMATIC TELESCOPE OBJECTIVE HAVING
THREE AIR SPACED COMPONENTS
Filed Oct. 2, 1946   2 Sheets-Sheet 2

| EF = 100 mm. | | | | f/5 |
|---|---|---|---|---|
| LENS | N | V | RADII | THICKNESSES |
| I | 1.3838 | 100.5 | $R_1 = +57.09$ mm | $t_1 = 3.9$ mm. |
|  |  |  | $R_2 = -40.20$ | $S_1 = 4.5$ |
| II | 1.6273 | 59.9 | $R_3 = -33.56$ | $t_2 = 1.2$ |
|  |  |  | $R_4 = \infty$ | $S_2 = 4.9$ |
| III | 1.3838 | 100.5 | $R_5 = +81.24$ | $t_3 = 3.5$ |
|  |  |  | $R_6 = -50.22$ |  |

MAXIMILIAN J. HERZBERGER
HARVEY O. HOADLEY
INVENTORS

BY
ATTY & AG'T

Patented Nov. 15, 1949

2,487,873

UNITED STATES PATENT OFFICE 2,487,873

APOCHROMATIC TELESCOPE OBJECTIVE HAVING THREE AIR SPACED COMPONENTS

Maximilian J. Herzberger and Harvey O. Hoadley, Rochester, N. Y., assignors to Eastman Kodak Company, Rochester, N. Y., a corporation of New Jersey Application October 2, 1946, Serial No. 700,642

4 Claims. (Cl. 88—57)

This is a continuation-in-part of our application Serial No. 548,003, filed August 4, 1944, and now abandoned.

This invention relates to apochromatic telescope objectives.

The object of the invention is to provide a telescope objective with greatly reduced secondary spectrum and with sharp definition at the axis for all the visible wavelengths of light.

The value of the crystals calcium fluoride, known as fluorite, and lithium fluoride as optical materials has been recognized and lies chiefly in their unusual partial dispersion ratios by which the secondary spectrum of optical systems can be corrected.

Optical glasses containing one or more fluorides also share this property, (although sometimes to a lesser degree). Glass being amorphous rather than crystalline has the advantage of easier working in the optical shop with less danger of breakage. A "fluoride glass" is one made of fluoride or having a considerable portion of fluoride in its composition, so that the mol percentage of fluorine is at least 10%.

Glasses made entirely of fluorides are described in a patent application by Sun and Huggins, Serial No. 568,314, filed December 15, 1944. All of these pure fluoride glasses (Example 1 to 40 in the Sun and Huggins application referred to) have refractive indices N between 1.35 and 1.45 and dispersive indices V between 90 and 105. Glasses made partly of fluorides are shown in the above-mentioned application and also in the following two applications: Serial No. 644,178, Sun and Huggins, now Patent No. 2,481,700, dated September 13, 1949, and Serial No. 644,179, Sun, both filed January 29, 1946. All of these glasses have refractive indices between 1.40 and 1.60 and with one exception their dispersive indices are between 68 and 96.

The theory of the secondary spectrum is extensively treated in the literature. The gist of it for the purpose of the present description is first that the "partial dispersion" P of an optical material is defined by the ratio $$P = \frac{N_t - N_F}{N_F - N_C}$$

where each subscript indicates the line in the spectrum to which the refractive index pertains and second that ideally the average P of the positive lens elements of an optical system should be equal to that of the negative elements to eliminate the secondary spectrum as regards the colors C, F, and g. The values of P usually differ slightly if the correction is made for a different set of three colors.

Unfortunately, in all ordinary glasses, P varies almost linearly with the dispersive index V so that $P + 0.00176\,V = 0.648$ approximately Hence any difference in dispersions that would be sufficient, practically speaking, to correct the primary chromatic aberration involves a corresponding difference in P's and thus secondary spectrum is practically unavoidable when ordinary glasses are used. Incidentally, the above relationship is a useful definition of "ordinary glasses."

Fluoride optical materials are very unusual and have much higher partial dispersions than ordinary glasses, depending very roughly upon the mol percentage of fluorine present, and so are highly desirable in the positive elements of a lens system. To improve the secondary color noticeably, the value $(P + 0.00176\,V)$, which will be designated as Q, should be 0.660 or larger, and to fully correct the secondary color Q should exceed 0.680, if ordinary glasses are to be used in the negative elements. As a rough rule, the materials in which Q is 0.660 or greater have a mol percentage of about 20 or more of fluorine in their composition. On the other hand, the fluor-crown glasses, previously known, all have less than 10% fluorine and are not noticeably out of ordinary as regards partial dispersions.

Boron is another element that has a marked effect upon the partial dispersion, but in the opposite direction. Borate crowns and flints (called "short flints") have been available commercially and are valuable for improving the secondary spectrum when used in the negative elements of ordinary optical systems. The early borate crowns were withdrawn from the market, however, probably because of technical difficulties of manufacture and the lack of demand, no glasses having been then available with sufficiently low dispersion for use in the positive elements in combination with negative elements of borate crown (or any crown for that matter). The ordinary boro-silicate crowns have too little boron to effect the partial dispersion noticeably.

Some borate crown glasses which have the advantage of having higher refractive indices than the early borate glasses are disclosed in Reissue 21,175, Morey, August 15, 1939; No. 2,206,081, Eberlin, July 2, 1940, and No. 2,241,249, Eberlin and DePaolis, May 6, 1941. Glasses having at least 25% boric oxide are preferred because they tend to have appreciably lower partial dispersions than normal.

When combining these unusual "short" glasses with the fluoride glasses the Q-values should differ by at least 0.016 to produce a satisfactory improvement in secondary spectrum, and preferably the P-values should differ by less than 0.016 for a substantially complete correction thereof. The comparison is made between the weighted average of the P- or Q-values of the positive elements and the corresponding average for the negative elements, weighted, that is, according to the dioptric power of the individual element.

According to the present invention we have discovered that not only can the secondary spectrum be reduced in a telescope objective but in the type of telescope objective consisting of a simple negative element airspaced between two simple biconvex elements, the zonal spherical aberration can be made very small and at the same time the chromatic variation of spherical aberration can be almost entirely eliminated. This type of lens should not be confused with the airspaced triplet commonly used as a photographic objective and highly corrected for all field aberrations.

In the preferable embodiment of this invention the negative element is biconcave and has a dioptric power between 1.8 and 2.8 times that of the objective. Also its front surface is more strongly curved than its rear surface but not more than five times as strongly curved, and it has a refractive index greater than 1.54. Also the front biconvex element has its front surface between 0.4 and 1.5 times as strongly curved as its rear surface, and the front element is between 0.5 and 2.0 times as strong as the rear one, both biconvex elements have a refractive index between 1.35 and 1.55, and finally this preferred embodiment has the biconvex elements spaced between 0.02F and 0.12F from the biconcave element, where F is the focal length of the objective.

According to a further development of the invention, we have found that the best correction of zonal spherical aberration is obtained when the refractive index of the negative element is high, preferably between 1.60 and 1.80, and that the shape of the negative element is not necessarily biconcave, but is such that the radius of curvature of its concave front surface is between —0.25F and 0.45F. The curvature of the rear surface of this element is determined by the dioptric powers and refractive indices involved, and may vary rather widely. It has also been found preferable that the refractive index of the positive element be less than that of the negative element by at least 0.15.

Figure 1:
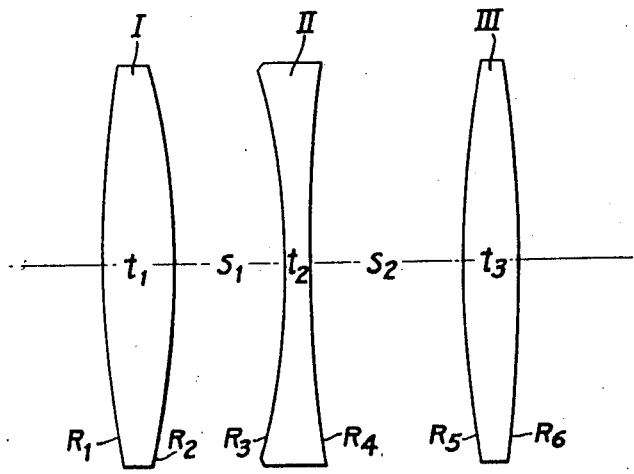
Fig. 1 shows a lens according to a preferred form of the invention, and specifications for one example.

In Fig. 1 the specifications are as follows:

*Example 1, Fig. 1*

F=100 mm.    f/5

| Lens | N | V | Radii | Thicknesses |
|---|---|---|---|---|
| I | 1.434 | 95.4 | $R_1=+49.1$ mm. $R_2=-42.6$ | $t_1=3.4$ mm. $S_1=5.1$ |
| II | 1.620 | 60.4 | $R_3=-34.1$ $R_4=+108.0$ | $t_2=1.2$ $S_2=7.1$ |
| III | 1.434 | 95.4 | $R_5=+62.9$ $R_6=-62.9$ | $t_3=2.6$ $BF=89.2$ | where N is the refractive index for the D line of the spectrum, V is the dispersive index, the radii are numbered from front to rear and are given as positive or negative according as they are convex or concave to the front.

Other embodiments according to Fig. 1 have the following specifications.

*Example 2, Fig. 1*

F=100 mm.    f/5

| Lens | N | V | Radii | Thicknesses |
|---|---|---|---|---|
| I | 1.434 | 95.4 | $R_1=+45.0$ mm. $R_2=-45.0$ | $t_1=3.5$ mm. $S_1=4.8$ |
| II | 1.620 | 60.4 | $R_3=-35.8$ $R_4=+111.0$ | $t_2=1.6$ $S_2=7.4$ |
| III | 1.434 | 95.4 | $R_5=+80.9$ $R_6=-59.6$ | $t_3=7.6$ |

*Example 3, Fig. 1*

F=100 mm.

| Lens | N | V | Radii | Thicknesses |
|---|---|---|---|---|
| I | 1.434 | 95.4 | $R_1=+40.7$ mm. $R_2=-48.4$ | $t_1=4.0$ mm. $S_1=4.8$ |
| II | 1.541 | 59.9 | $R_3=-34.6$ $R_4=+74.0$ | $t_2=1.7$ $S_2=8.5$ |
| III | 1.434 | 95.4 | $R_5=+136.0$ $R_6=-47.9$ | $t_3=3.0$ |

In Examples 1 and 2 the biconvex elements are made of fluorite and the biconcave element of dense barium crown. These two materials were chosen because they have almost identical partial dispersions and are particularly useful in obtaining an almost perfect correction of secondary spectrum. The curvatures and spacings shown are such as cooperate with the particular refractive indices of these materials to correct the zonal spherical aberration and the chromatic variation of spherical aberration to a high degree, as is shown in the following table relative to Example 1:

| Wavelength, Angstrom Units | Aberration from "D" paraxial focus | | |
|---|---|---|---|
| | f/5.0 | f/7.1 | Paraxial |
| | Mm. | Mm. | Mm. |
| A' 7682 | −.004 | −.020 | −.012 |
| C 6563 | +.010 | −.005 | +.002 |
| D 5893 | +.007 | −.007 | |
| e 5461 | +.001 | −.011 | −.005 |
| F 4861 | −.013 | −.023 | −.017 |
| g 4358 | −.021 | −.027 | −.020 |
| h 4047 | −.018 | −.021 | −.015 |
| 3650 | +.029 | +.029 | +.035 |

The Fraunhofer designation of the lines of the spectrum is given along with the wavelength in Angströms. The aberration from "D" paraxial focus is defined as the back focus or intersection length of the ray in question minus the paraxial back focal length for the D line.

Actual objectives made according to the above specifications show extreme sharpness and clearness of the image at and near the axis and the effect is very striking in comparison with ordinary telescopes.

In Example 3, both outer elements are of fluorite and the biconcave one is of light barium crown glass. In the first two examples the rear element had radii of curvature with a mutual ratio in the same 0.4 to 1.5 range specified for the front component but in this third example the ratio is over 2.8.

Furthermore it will be noted that this third example differs considerably from the first two whereas the difference between the first two is quite insignificant.

Figure 2:
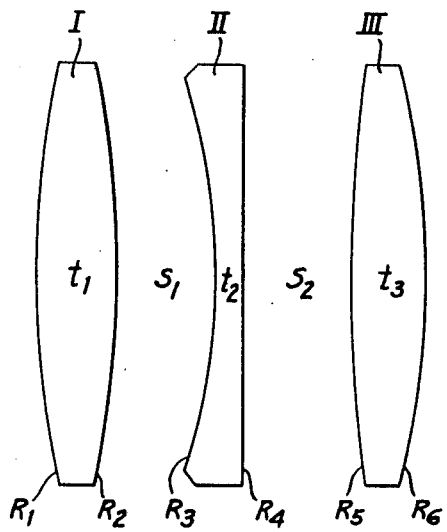
Fig. 2 shows a lens according to a slightly different form of the invention, and specifications for one example also.

In Fig. 2 the specifications are as follows:

*Example 4, Fig. 2*

EF=100 mm.    f/5

| Lens | N | V | Radii | Thicknesses |
|---|---|---|---|---|
| I | 1.3838 | 100.5 | $R_1=+57.09$ mm. $R_2=-40.20$ | $t_1=3.9$ mm. $S_1=4.5$ |
| II | 1.6273 | 59.9 | $R_3=-33.56$ $R_4=\infty$ | $t_2=1.2$ $S_2=4.9$ |
| III | 1.3838 | 100.5 | $R_5=+81.21$ $R_6=-50.22$ | $t_3=3.5$ |

A variation of this design has the following specification:

*Example 5, Fig. 2*

EF=100 mm.    f/5

| Lens | N | V | Radii | Thicknesses |
|---|---|---|---|---|
| I | 1.3838 | 100.5 | $R_1=+54.35$ mm. $R_2=-41.67$ | $t_1=3.9$ mm. $S_1=4.5$ |
| II | 1.6492 | 60.3 | $R_3=-35.00$ $R_4=\infty$ | $t_2=1.2$ $S_2=4.5$ |
| III | 1.3838 | 100.5 | $R_5=+87.01$ $R_6=-51.58$ | $t_3=3.5$ |

In Examples 4 and 5 the positive elements I and III are made of a pure fluoride glass closely corresponding to example 10 of the Fluoride glass application No. 568,314 already referred to. In Example 4 the negative element is made of a borate glass described in the Sun and Callear application already mentioned. In Example 5 the second lens is made of a fluoborate glass of the general type shown in another copending application, Serial No. 646,681, filed February 9, 1946, by Sun, now Patent No. 2,456,033, dated December 14, 1948. On account of the fluorine and boron counteracting each other in respect to the partial dispersion, the fluoborate glasses tend to be little if any out of the ordinary.

In Examples 1, 2, 4, and 5, the refractive index $N_2$ of the negative element is between 1.60 and 1.80 and is greater than that of the front and rear elements by more than 0.15 in accordance with these features of the invention. These lenses have better correction of zonal spherical abberation than does Example 3 in which $N_2$ is smaller.

In all the examples the radius of curvature $R_3$ of the front surface of the negative element is between the specified limits $-0.25F$ and $-0.45F$, and in fact is within much narrower limits, $-0.33F$ to $-0.36F$.

It is further to be pointed out that the low dispersions (high dispersive indices) of the materials used is a direct and marked aid in reducing the sphero-chromatism. The dispersive indices of all the negative elements are between 43 and 65, preferably greater than 50, and those of the positive elements are between 68 and 105, preferably greater than 85.

The optical quality of Example 4 is closely comparable with that of Examples 1 and 2, and every example is a marked improvement over telescope triplets known previously to the present invention.

What we claim and desire to be secured by Letters Patent of the United States is:

1. A telescope objective comprising a simple negative element whose refractive index is greater than 1.54 and less than 1.8 axially aligned between two simple biconvex elements whose refractive indices are between 1.35 and 1.55 and also less than that of the negative element and spaced therefrom by more than 0.02F and less than 0.12F where F is the focal length of the objective, such that the power of the negative element is between 1.8 and 2.8 times that of the objective, the power of the front element is between 0.5 and 2.0 times that of the rear element, the ratio of the curvature of the front surface of the front element to that of the rear surface of the front element is numerically between 0.4 and 1.5, and the front surface of the negative element is concave and has a radius of curvature between 0.25F and 0.45F.

2. A telescope objective comprising a simple biconcave element with refractive index greater than 1.54 between two simple biconvex elements with refractive indices between 1.35 and 1.55 and each spaced from the biconcave element more than 0.02F and less than 0.12F where F is the focal length of the objective, such that the power of the biconcave element is numerically between 1.8 and 2.8 times that of the objective, the power of the front element is between 0.5 and 2.0 times that of the rear element, and the ratio of the curvature of the front surface of an element to that of the rear surface of the same element is numerically between 0.4 and 1.5 in the case of the front biconvex element and between 1.0 and 5.0 in the case of the biconcave element.

3. An objective substantially according to the following specifications:

| Lens | N | V | Radii | Thicknesses |
|---|---|---|---|---|
| I | 1.38 | 100 | $R_1=+0.6F$ $R_2=-0.4F$ | $t_1=0.04F$ $S_1=0.04F$ |
| II | 1.63 | 60 | $R_3=-0.3F$ $R_4>5F$ | $t_2=0.01F$ $S_2=0.05F$ |
| III | 1.38 | 100 | $R_5=+0.8F$ $R_6=-0.5F$ | $t_3=0.04F$ | where the first column designates the lens elements by Roman numerals in order from front to rear and where F is the focal length of the objective, N is the index of refraction for the D line of the spectrum, V is the dispersive index, R, t, and S refer respectively to the radii of curvature of the refractive surfaces, the thickness of the elements, and the airspaces between the elements, the subscripts on these refer to the surfaces, the elements, and the spaces numbered consecutively from the front, and the + and − signs in the fourth column correspond to surfaces which are respectively convex and concave to the front.

4. An objective substantially according to the following specifications:

| Lens | N | V | Radii | Thickness |
|---|---|---|---|---|
| I | 1.434 | 95.4 | $R_1=+0.5F$ $R_2=-0.4F$ | $t_1=0.03F$ $S_1=0.05F$ |
| II | 1.62 | 60 | $R_3=-0.3F$ $R_4=+1.1F$ | $t_2=0.01F$ $S_2=0.07F$ |
| III | 1.434 | 95.4 | $R_5=+0.6F$ $R_6=-0.6F$ | $t_3=0.03F$ | where the first column designates the lens elements by Roman numerals in order from front to rear and where F is the focal length of the objective, N is the index of refraction for the D line of the spectrum, V is the dispersive index, R, t, and S refer respectively to the radii of curvature of the refractive surfaces, the thickness of the elements, and the airspaces between the elements, the subscripts on these refer to the surfaces, the elements, and the spaces numbered consecutively from the front, and the + and − signs in the fourth column correspond to surfaces which are respectively convex and concave to the front.

MAXIMILIAN J. HERZBERGER.
HARVEY O. HOADLEY.

REFERENCES CITED

The following references are of record in the file of this patent:

UNITED STATES PATENTS

| Number | Name | Date |
|---|---|---|
| 1,541,407 | Spangenber | June 9, 1925 |
| 1,892,162 | Richter | Dec. 27, 1932 |
| 1,987,878 | Tronnier | Jan. 15, 1935 |
| 2,279,372 | Herzberger | Apr. 14, 1942 |
| 2,298,090 | Warmisham | Oct. 6, 1942 |
| 2,388,869 | Reiss | Nov. 13, 1945 |

FOREIGN PATENTS

| Number | Country | Date |
|---|---|---|
| 29,636 | Great Britain | of 1913 |
| 165,657 | Great Britain | July 7, 1921 |
| 204,002 | Great Britain | Sept. 20, 1923 |